United States Patent
Fang

(10) Patent No.: US 10,275,533 B2
(45) Date of Patent: Apr. 30, 2019

(54) SEARCH ENGINE AND METHOD FOR IMPLEMENTING THE SAME

(71) Applicant: Baidu Online Network Technology (Beijing) Co., Ltd., Beijing (CN)

(72) Inventor: Gaolin Fang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 595 days.

(21) Appl. No.: 14/954,784

(22) Filed: Nov. 30, 2015

(65) Prior Publication Data
US 2016/0371379 A1 Dec. 22, 2016

(30) Foreign Application Priority Data

Jun. 18, 2015 (CN) .......................... 2015 1 0342427

(51) Int. Cl.
  *G06F 17/30* (2006.01)
(52) U.S. Cl.
  CPC .... *G06F 17/30867* (2013.01); *G06F 17/3053* (2013.01); *G06F 17/30345* (2013.01); *G06F 17/30528* (2013.01); *G06F 17/30699* (2013.01); *G06F 17/30864* (2013.01)
(58) Field of Classification Search
  CPC ................................................ G06F 17/30528
  See application file for complete search history.

(56) References Cited

U.S. PATENT DOCUMENTS

| 8,898,180 | B2 | 11/2014 | Xie et al. | |
| 9,430,568 | B2 | 8/2016 | Xie et al. | |
| 2008/0300910 | A1* | 12/2008 | Ku | G06F 17/30864 705/1.1 |
| 2010/0080719 | A1 | 4/2010 | Boggess, Jr. et al. | |
| 2011/0044197 | A1* | 2/2011 | Koren | G06Q 30/02 370/252 |
| 2011/0208735 | A1 | 8/2011 | Gao et al. | |
| 2011/0270828 | A1 | 11/2011 | Varma et al. | |
| 2013/0159320 | A1 | 6/2013 | Gao et al. | |
| 2013/0318101 | A1 | 11/2013 | Chen et al. | |
| 2017/0154068 | A1* | 6/2017 | Lv | G06F 17/30371 |

FOREIGN PATENT DOCUMENTS

| JP | 2006251935 A | 9/2006 |
| WO | 2010080719 A1 | 7/2010 |

\* cited by examiner

*Primary Examiner* — Grace Park
(74) *Attorney, Agent, or Firm* — Knobbe Martens Olson & Bear LLP

(57) ABSTRACT

Search engine method includes: receiving a user query request input; searching candidate results matching with the query request; determining a semantic relatedness between the query request and each candidate result based on a click-escape model; sorting the candidate results according to the semantic relativity. The click-escape model has an escape dictionary, a non-escape dictionary, or a combination thereof. Sorting candidate results of a search in accordance with a semantic relatedness can enhance the sorting effect of the searched results, avoid searched results which do not match the user's query appearing in the forefront of the searched result list, and guarantee a good user experience.

16 Claims, 6 Drawing Sheets

SEARCH ENGINE AND METHOD FOR IMPLEMENTING THE SAME

CROSS REFERENCE TO RELATED APPLICATION

The present application claims priority and benefits of Chinese Patent Application No. 201510342427.4, filed on Jun. 18, 2015, the entirety of which is incorporated herein by reference.

TECHNICAL FIELD

The present disclosure generally relates to the field of computer technology, and particularly to the field of information search, and more particularly to a search engine and a method for implementing the search engine.

BACKGROUND OF THE APPLICATION

The Internet provides access to various resources which comprises, for example, image files, audio files, video files, web pages and the like. A user may search for desirable resources through a search system or a search engine. The query may be a text query which comprises one or more search terms or phrases. The search engine may, for example, return a searched result corresponding to the query via a text related matching method.

During actual search process, the result returned by the text related matching method often does not match the user's query, and escape occurs. For example, the user searches a star A, and the searched result may include texts associated with "rides of A"; and a result including "海里有挂满中国国旗的渔船 (There is a fishing boat covered with Chinese flags in the sea)" may be retrieved when "中国国旗 (Chinese flag)" is searched.

The existing text matching schemes comprise: ratios of common part of a query and the searched result thereof to the query and the searched result, relatedness means of BM25, etc. However, those matching programs cannot address the above mentioned escape issue.

SUMMARY

In view of the above drawbacks or deficiencies in the prior art, it is desirable to provide an effective solution to address the escape issue of the searched result.

In a first aspect, an embodiment of the present application provides a method for implementing a search engine. The method comprises: receiving a query request input by a user; searching candidate results that match the query request; determining semantic relatedness between the query request with each of the candidate results based on a click-escape model; and sorting the candidate results according to the semantic relativity; and wherein the click-escape model comprises an escape dictionary and/or a non-escape dictionary. The escape dictionary comprises a term corresponding to the searched result which is determined to escape and a preceding term and a following term of the term, and the non-escape dictionary comprises a term corresponding to the searched result which is determined not to escape and a preceding term and a following term of the term.

In a second aspect, an embodiment of the present application also provides a search engine which comprises: a receiving unit, configured for receiving a query request input by a user; a searching unit, configured for searching candidate results that match the query request; a semantic relatedness determining unit, configured for determining semantic relatedness between the query request with each of the candidate results based on a click-escape model; and a sorting unit, configured for sorting the candidate results according to the semantic relativity, and wherein the click-escape model comprises an escape dictionary and/or a non-escape dictionary. The escape dictionary comprises a term corresponding to the searched result which is determined to escape and a preceding term and a following term of the term, and the non-escape dictionary comprises a term corresponding to the searched result which is determined not to escape and a preceding term and a following term of the term.

The search engine and the method for implementing the same provided by an embodiment of the present application can search more comprehensive webpage contents associated with URL via searching a HTTP request chain associated with URL by clicking, and thus can accurately detect malicious websites. According to technical solutions of the embodiments of the present application, sorting candidate results of a search in accordance with a semantic relatedness can enhance the sorting effect of the searched results, avoiding searched results which do not match the user's query (i.e., an escape result) appearing in the forefront of the searched result list, and thereby guaranteeing a good user experience.

BRIEF DESCRIPTION OF THE DRAWINGS

Other features, objects and advantages of the present application will become more apparent from a reading of the detailed description of the non-limiting embodiments, said description being given in relation to the accompanying drawings, among which.

DETAILED DESCRIPTION

The present application will be further described in detail in conjunction with the accompanying drawings and embodiments. It should be understood that the specific embodiments described herein are provided to illustrate the present invention, instead of limiting the present invention. It also should be noted that only parts related to the present invention are shown in the figures for convenience of description.

It should be noted that, the embodiments of the present application and the features in the present application, on a non-conflict basis, may be combined with each other. The present application will be further described in details below in conjunction with the accompanying drawings and embodiments.

As mentioned in the Background part, escape issue may occur generally due to partial matching of text in text searches. For example, the results comprise mosquito coils box when the term "mosquito coil" is searched; the results comprise mobile phone leather cover when the term "mobile phone" is searched; the results comprise Changshan cabbages when the term "Changshan" is searched. Such issue is especially obvious when pictures are searched using texts. For example, when the pictures of "star A" are searched, the results comprise the photographs of Star A, high-definition photos of star A, concerts of star A, rides of star A, etc. Among these results, the rides of star A are the escape results rather than the results actually wanted by the user.

In view of the above disadvantages in the prior art, embodiments of the present application provide a solution of sorting searched results by the semantic escape degree so as to address the above-discussed escape issue. It may be understood that a result with a larger number of clicks is usually the desirable result among the results displayed in a search process. In other terms, the probability that an escape doesn't occur of a result with a larger number of clicks is very high with respect to a user's query. In contrast, a result, which is displayed for many times, with a smaller number of clicks or even no click is usually undesirable for the user, i.e., for those results, the probability that the escape occurs of those results is very high with respect to the user's query. In addition, based on the analysis of the data of the escapes, it has been found that most of the escapes occur in the adjacent preceding term and the adjacent following term, and the preceding term and the following term at relatively farther positions are substantially not affected. Therefore, the method for implementing the search engine of an embodiment of the present application is provided based on the above analysis.

Figure 1:
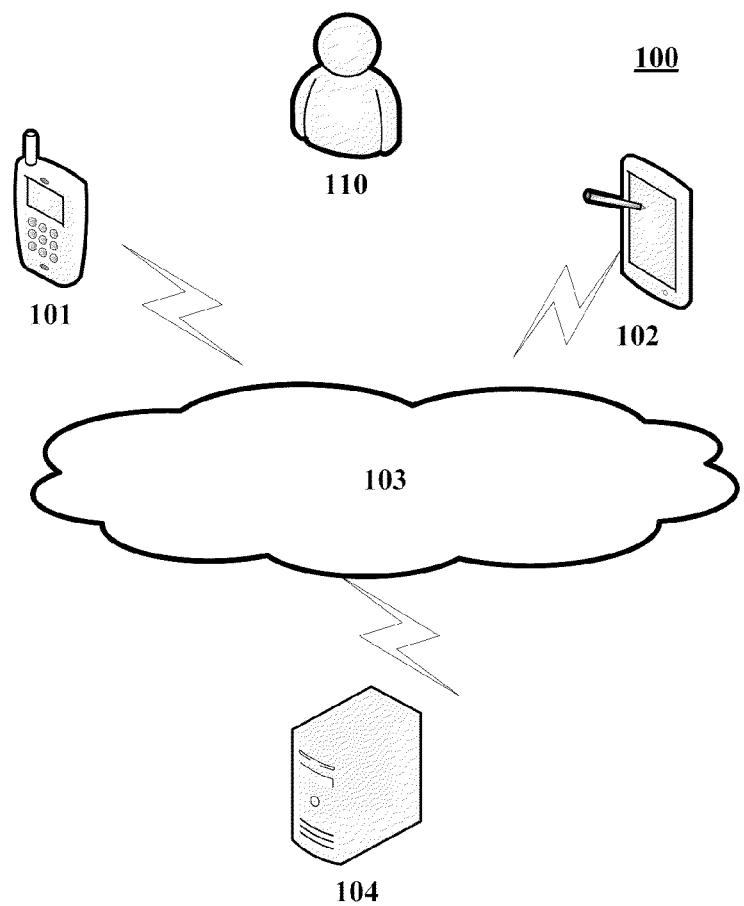
FIG. 1 illustrates an exemplary system architecture 100 of an embodiment of the present application.

Referring to FIG. 1, an exemplary system architecture 100 where an embodiment of the present application may be implemented is illustrated.

As shown in FIG. 1, the system architecture 100 may comprise terminal devices 101, 102, a network 103 and a server 104. The network 103 serves to provide mediums for communication links between the terminal devices 101, 102 and the server 104. The network 103 may comprise various types of connections, such as wired communication links, wireless communication links, fiber-optic cables or the like.

User 110 may use the terminal devices 101, 102 to interact with the server 104 through the network 103, so as to access a variety of services, such as searching for information, browsing web pages, downloading data, etc. Various client applications may be installed on the terminal devices 101, 102, for example, an application which may access Uniform Resource Locator (URL) cloud services. These client applications may include, but are not limited to, browser, security application, etc.

The terminal devices 101, 102 may be various electronic devices, which may include, but are not limited to, for example, various mobile portable devices, such as smart phones, tablet computers, personal digital assistants, e-book readers, as well as various fixed terminal equipment, such as PCs, smart TVs, inquiry service terminals.

The server 104 may be a server providing various services. The server may provide services in response to a service request from a user. It should be appreciated that one server may provide one or more services, and the same service may be provided by a plurality of servers. The server 104 involved in the embodiment of the present application may be a search server.

It should be understood that the numbers of the terminal devices, the networks and the servers shown in FIG. 1 are only illustrative. Any numbers of the terminal devices, the networks and the servers may be arranged as required in actual implementation.

In order to describe the method for implementing the search engine according to the embodiment of the present application, the construction of the click-escape model provided in the embodiment of the present application will be described firstly. As previously analyzed, the probability that an escape doesn't occur of a result with a larger number of clicks is high with respect to a corresponding query; and the probability that an escape occurs of a result with a smaller number of clicks or even no click is high with respect to a corresponding query. In addition, it has been found that most of the escapes occur in the adjacent preceding term and the adjacent following term, and the preceding term and the following term at relatively farther positions are substantially not affected. Therefore, in the embodiment of the present application, the click-escape model is constructed by learning the number of clicks of a Query-Title pair for the query request and the searched results (for example, indicated by webpage title) while considering the preceding term and the following term around the position where the escape occurs. Particularly, the click-escape model may comprise an escape dictionary and/or a non-escape dictionary. The escape dictionary comprises a term corresponding to the searched result which is determined to escape and a preceding term and a following term of the term, and the non-escape dictionary comprises a term corresponding to the searched result which is determined not to escape and a preceding term and a following term of the term.

Figure 2:
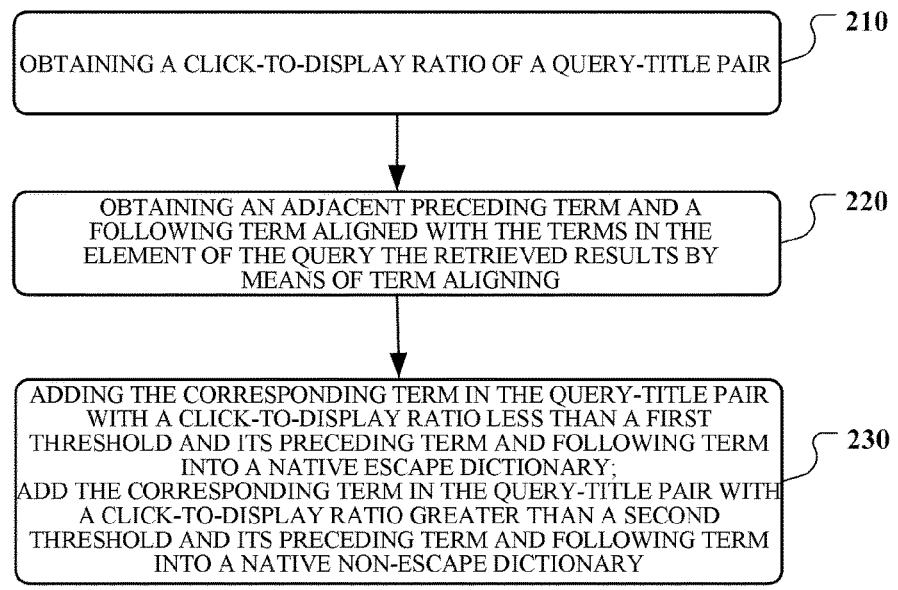
FIG. 2 illustrates an exemplary flow chart of a method for constructing a click-escape model according to an embodiment of the present application.

FIG. 2 illustrates an exemplary flow chart of a method for constructing click-escape model according to the embodiment of the present application.

As illustrated in FIG. 2, in step 210, a click-to-display ratio of a Query-Title pair is obtained.

The click-escape model may be constructed by learning historical Query-Title pairs. These historical Query-Title pairs may be stored in a Query log. The Query log records, for example, query requests Query used during each of the user query sessions, displayed searched results and user's click operations on the searched results and the like. For example, these searched results may be represented by a webpage title. Therefore, the Query-Title pair refers to a query-searched result pair.

Statistical analyses may be performed on the display and click of each of the Query-Title pairs, so as to obtain the click-to-display ratios of the Query-Title pairs. Here, the click-to-display ratio is a ratio of the number of clicks to the number of display, and wherein the number of display represents the number of searched result Title being displayed in response to the query request Query, and the number of clicks represents the number of times the searched result Title is clicked by a user when it is displayed in response to the query request Query.

From the above analyses, it can be seen that the probability that an escape doesn't occur of a searched result with a larger number of clicks is high with respect to the corresponding query, and the probability that an escape occurs of a searched result with a smaller number of clicks or even no click is high with respect to the corresponding query. Therefore, the click-to-display ratio of the Query-Title pair can fairly well represent an escape degree or escape probability of the Title with respect to the Query. Those skilled in the art should appreciate that the escape degree or escape probability may be represented using, such as a display-click ratio or other parameters constructed based on the number of clicks. The present application has no limitation in this aspect.

Next, in step 220, an adjacent preceding term and a following term aligned with the terms in the element of the Query are obtained from the searched results Title by means of term aligning.

Firstly, for each Query-Title pair, term segmentation may be performed to the Query and the Title, respectively. Then, the corresponding position of each of the terms in the Query is located in the Title by means of term aligning. The term aligning used herein further comprises synonymous aligning. For example, synonyms of a term may be considered if the completely corresponding term thereof does not exist. At last, adjacent preceding and following terms of the aligned first term and the aligned last term in the Query are obtained from the Title.

Figure 3:
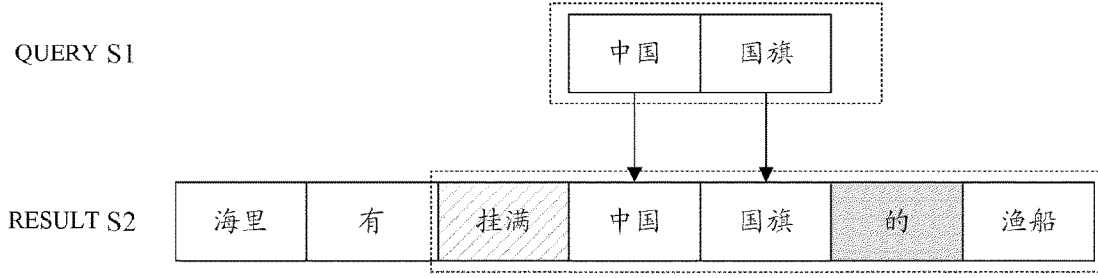
FIG. 3 illustrates an exemplary implementation of searching adjacent preceding and following terms by means of term aligning according to an embodiment of the present application.

FIG. 3 illustrates an exemplary implementation of searching the adjacent preceding term and the adjacent following term by means of term aligning according to the embodiment of the present application. In the example in FIG. 3, the Query is "中国国旗", and the Title is "海里有挂满中国国旗的渔船".

As shown in FIG. 3, term segmentation is performed respectively on the Query and the Title. Specifically, the Query is segmented into "中国 (Chinese)" and "国旗 (flag)", and the Title is segmented into "海里 (in the sea)", "有 (there is)", "挂满 (covered with)", "中国", "国旗", "的" and "渔船 (fishing boat)". In FIG. 3, the terms are separated by boxes.

Then, for each of the terms in the Query, the corresponding position thereof in the Title is located by means of term aligning. In the example in FIG. 3, a term completely corresponding to each of the terms in the Query ("中国" and "国旗") may be found in the Title, as indicated by the arrow in FIG. 3.

At last, adjacent preceding and following terms of the aligned first term and the aligned last term in the Query are obtained from the title. More specifically, the adjacent preceding term of the aligned first term and the adjacent following term of the aligned last term are obtained. In this example, the adjacent preceding term of the first term "中国" is "挂满", and the adjacent following term of the last term "国旗" is "的". The stopword "的" should be filtered, and then a following non-stopword may be searched as the following term. Namely, the adjacent following term of "国旗" is "渔船".

Human language comprises many functional terms. Compared with other terms, functional terms do not have actual meanings. The most common functional terms are the determiners (such as "这", "这个", "那", "那些", "the", "a", "an", "that", and "those"), which help describing nouns and expressing concepts, such as locations or numbers, in a text. Prepositions, such as "在 . . . 上", "在 . . . 下", "over", "under", "above", etc, indicate the relative position of two terms. These functional terms are very common, and a large disk space is required to record the numbers of them in each document. In addition, these terms rarely express information of document relatedness due to their universality and functionality. The functional terms are not helpful if each term, instead of a phrase, is considered during a search process.

The functional term is also referred to as stopword in information searches, since a text process will be stopped immediately if a stopword is encountered during the text process, and the stopword will be discarded. Discarding those stopwords reduces the amount of indexes, improves search efficiency, and usually improves the effects of the searches. Stopwords mainly comprise English characters, numbers, mathematical symbols, punctuation marks and single Chinese characters very frequently used and the like.

Referring back to FIG. 2, in step 230, an escape dictionary and/or a non-escape dictionary is constructed correspondingly based on a click-to-display ratio. Specifically, the corresponding term in the Query-Title pair with a click-to-display ratio less than a first threshold and its preceding term and following term are added into an escape dictionary; and/or the corresponding term in the Query-Title pair with a click-to-display ratio greater than a second threshold and its preceding term and following term are added into a non-escape dictionary. The first threshold and the second threshold may be the same or different.

The process shown in FIG. 2 is performed on each of the historical Query-Title pairs, and then the escape dictionary may be created by accumulating the terms in all Query-Title pairs with a click-to-display ratio less than the first threshold and combining the corresponding preceding and following terms; and the non-escape dictionary may be created by accumulating the terms in all Query-Title pairs with a click-to-display ratio greater than the second threshold and combining the corresponding preceding and following terms. The above escape dictionary created herein may also be referred as a native escape dictionary and the above non-escape dictionary created herein may be referred as a native non-escape dictionary, since the terms in the Query are not expanded during the creation of the corresponding escape and non-escape dictionaries.

Optionally or additionally, in some embodiments, a generalized escape dictionary and/or a generalized non-escape dictionary may be created by generalizing the semantic categories of the terms in the Query, so as to promote the statistical preceding and following terms to a greater range.

In these embodiments, the semantic categories of the terms in the Query may be tagged so that the generalization is carried out by the semantic categories of the terms. For example, if the term is the name of a star A, its semantic category may be tagged as Star; and if the term is Jiuzhaigou, its semantic category may be tagged as Attraction. Some terms for entities may be replaced with semantic categories through semantic category tagging.

Semantic category tagging may be performed on terms in various ways. For example, a common maximum entropy classifier may be used to classify and identify terms. For example, semantic categories may comprise, but are not limited to, the following categories: entertainment star, sports star, people in science and technology, attraction, film, car, cartoon, animal, plant and the like.

Next, the tagged semantic categories may be used to construct a generalized escape dictionary and a generalized non-escape dictionary corresponding to the native escape dictionary and the native non-escape dictionary. In one implementation, an original term in the native escape dictionary/the native non-escape dictionary may be replaced with a generalized semantic category, and thus the generalized escape dictionary/the generalized non-escape dictionary is created.

The construction of the click semantic model of the embodiment of the present application is described above, and a scheme for improving the searched result of a search engine based on the click semantic model will be described below in conjunction with a flow chart.

Figure 4:
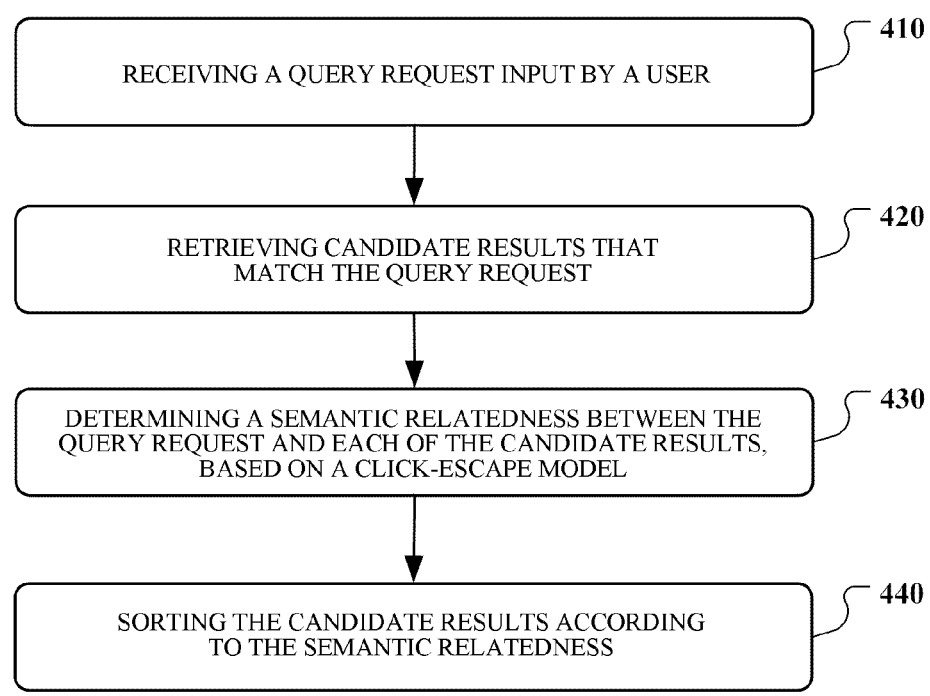
FIG. 4 illustrates an exemplary flow chart of an method for implementing a search engine according to an embodiment of the present application.

FIG. 4 illustrates an exemplary flow chart of a method for implementing the search engine according to one embodiment of the present application. The method shown in FIG. 4 may be performed by a server (for example, the server 104 in FIG. 1) where the search engine is located.

As shown in FIG. 4, in step 410, a query request input by a user is received.

The user may input the query request through various terminal devices (for example, terminal devices 101 and 102 shown in FIG. 1). Those terminal devices may present a user interface to the user (for example, a browser interface) to enter a query request. The user may enter the query request via various input tools, such as touch screen, stylus, keyboard, microphone and the like. The query request may be a text query, a voice query or other types of queries. If the query request is a non-text query, various appropriate technologies, such as optical character recognition (OCR), speech recognition or the like, may be employed to convert the non-text query to a text query. Afterwards, the terminal devices may transmit the originally received query request or a converted query request to the search server (for example, the server 104 in FIG. 1).

Next, in step 420, the received candidate results that match the received query request are searched.

The candidate results that match the query request may be searched in various ways. In some implementations, text matching, for example, term matching, may be used to search the candidate results that match the query request. Some common algorithms for term matching may comprise, for example, BM25 (Best Match) algorithm, proximity (Term proximity scoring, scoring term neighbor) algorithm, etc.

Then, the candidate results that match the query request may be provided based a matching degree between the searched document and the query request which is calculated by a term matching algorithm. The above search method may be implemented by various currently known algorithms, and thus the detailed description thereof will not be repeated herein.

Then, in step 430, a semantic relatedness between the query request and each of the candidate results is determined based on the click-escape model.

In an actual search, a certain number of candidate results are usually selected from the candidate results that match the query request for a refinement process. For example, 2000 candidate results may be selected, and each of the selected candidate results is analyzed for the semantic relatedness between the candidate result and the query request.

As described above in conjunction with FIGS. 2 and 3, the click-escape model is constructed by learning the number of the Query-Title pair of the query request and the searched results while considering the preceding term and the following term around the position where the escape occurs. Specifically, the click-escape model may comprise an escape dictionary and/or a non-escape dictionary, wherein the escape dictionary comprises a term corresponding to the searched result which is determined to escape and a preceding term and a following term of the term, and the non-escape dictionary comprises a term corresponding to the searched result which is determined not to escape and a preceding term and a following term of the term.

Therefore, the semantic relatedness determined based on the click-escape model considers the number of clicks of the Query-Title pair and the preceding term and the following term around the position where the escape occurs, and thus the determined semantic relatedness may accurately represent a escape probability of the candidate results with respect to the query request. The method for determining semantic relatedness based on the click-escape model will be described below in details.

At last, in step 440, the candidate results are sorted according to the semantic relatedness.

In this step, the candidate results searched by searching are sorted and displayed in a descending order of the semantic relatedness between each of the candidate results and the query request, so that the first displayed searched results are always more relevant with the query request, and thus the user may quickly search more desirable associated documents from the displayed searched results to meet his/her search needs, improving search efficiency. It should be appreciated that in this step, other orders may also be employed as required.

Figure 5:
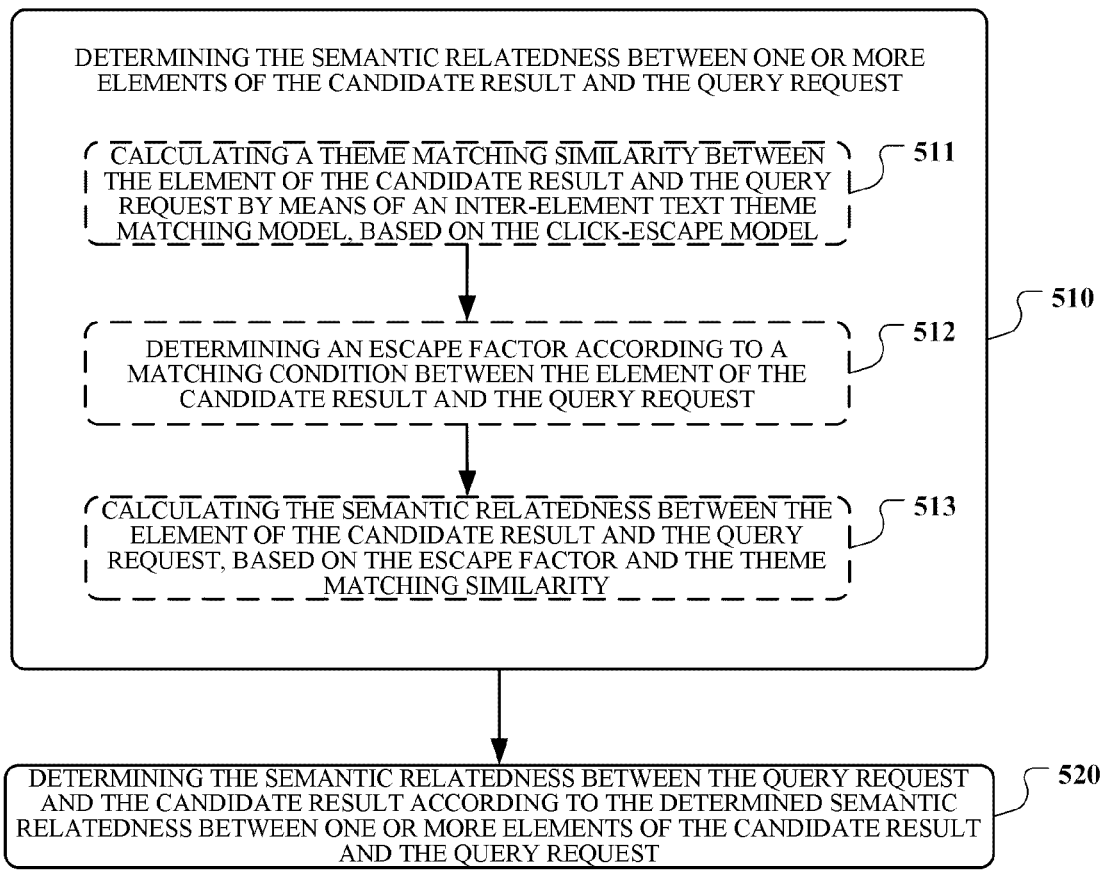
FIG. 5 illustrates an exemplary flow chart of a method for determining semantic relatedness between a query request and candidate results thereof based on a click-escape model according to an embodiment of the present application.

FIG. 5 illustrates an exemplary flow chart of a method for determining semantic relatedness between the query request and the candidate result based on the click-escape model according to the embodiment of the present application. That is, FIG. 5 shows one exemplary implementation of step 430 in FIG. 4.

As shown in FIG. 5, in step 510, the semantic relatedness between the query request and one or more elements of the candidate result is determined.

The candidate results, i.e., various information of web pages, may be represented by documents. Generally, the document comprises a plurality of elements. The document may structurally comprise title, anchor text, text and the like. The title describes the theme of the document concisely and precisely. As a kind of links that similar to the hyperlink, the anchor text is also referred to as anchor text link. This kind of link may be referred as an anchor text if a keyword is used as a link pointing to another webpage. The anchor text actually establishes a relationship between the text keyword and a URL link. The text usually includes more contents.

Since the candidate result generally has a plurality of elements, the semantic relatedness between the query request and one or more elements of the candidate result are determined respectively. Those elements may be selected from, for example, title, anchor text, core sentence in the text and the like. The core sentences in the text may be determined by various means known in the art or developed in the future. In one implementation, the first sentence in the text may be taken as the core sentence thereof.

Next, in step 520, the semantic relatedness between the query request and the candidate result is determined according to the determined semantic relatedness between the query request and one or more elements of the candidate result.

The final semantic relatedness between the query request and the candidate results may be determined by various means. In one implementation, the maximum value of the determined semantic relatedness may be selected as the semantic relatedness between the query request and the candidate result. In another implementation, the average value of the determined semantic relatedness may be taken as the semantic relatedness between the query request and the candidate result. Those skilled in the art will understand that other functions may be used to determine the final semantic relatedness between the query request and the candidate result based on the plurality of determined semantic relatedness, and the present application has no limitation in this aspect.

Step 510 further illustrates an exemplary implementation of a method for determining a semantic relatedness between a query request and one element of the candidate result according to the embodiment of the present application. In this implementation, the semantic relatedness mainly comprises: a theme matching similarity between the elements and an escape factor between the elements.

Specifically, in step 511, the theme matching similarity between the query request and the candidate result is calculated utilizing the inter-element text theme matching model based on a pre-constructed click-escape model.

The theme matching similarity between two elements may be represented in a variety of metric forms. In some implementations, the theme matching similarity between elements may be calculated by a similarity calculating method for vector space model of a unified framework.

For example, two elements may be represented by $S_1$, $S_2$ respectively as:

$$S_1 = \{(w_{11_1}, w_{11_2} \ldots w_{11_k}), (w_{12_1}, w_{12_2} \ldots w_{12_k}), \ldots, (w_{1m_1}, w_{1m_2} \ldots w_{1m_k})\} \quad (1)$$

$$S_2 = \{(w_{21_1}, w_{21_2} \ldots w_{21_k}), (w_{22_1}, w_{22_2} \ldots w_{22_k}), \ldots, (w_{2n_1}, w_{2n_2} \ldots w_{2n_k})\} \quad (2)$$

In the above formula, the elements are segmented. For example, the first element $S_1$ is segmented into m terms, and the second element $S_2$ is segmented into n terms. The part-of-speeches of the segmented terms are tagged, and thus a term set at each of the term segmentation positions is obtained. For example, the term set at a term segmentation position $w_{1i}$ of the first element $S_1$ is $(w_{1i_1}, w_{1i_2} \ldots w_{1i_k})$. The term set comprises original term, related terms, and small-granularity components corresponding to the term segmentation position $w_{1i}$.

Herein, a term having the same semantic meaning as the original term (or a synonym) and a term with similar semantic meaning to the original term are collectively referred to as the related terms. The related terms of an original term can be found by various means, for example, based on a Query-Title click pair. The above related term finding method may be implemented by various known schemes, which will not be repeated herein.

After the element is represented as a vector space, the similarity between two vectors, i.e., the theme matching similarity, may be calculated by various metric means. Those metric means include, but are not limited to, cosine distance (also referred to as cosine similarity), Euclidean distance, Pearson correlation coefficient or corrected Pearson correlation coefficient, which are known in the art. As an example, only the cosine distance will be illustrated below.

The cosine distance employs a cosine of an angle between two vectors in a vector space as a measurement for measuring the size of difference between two individuals. For example, the theme matching similarity between two elements may be calculated by the following formula:

$$Sim(S_1, S_2) = \frac{\sum_{w_{1k_i} = w_{2k_j}} \left(Wgt(w_{1k_i}) * Wgt(w_{2k_j})\right)}{\sqrt{\sum_{t=1\ldots m} Wgt(w_{1k_t})^2} \sqrt{\sum_{j=1\ldots n} Wgt(w_{2k_j})^2}} * SentType(S_1, S_2) \quad (3)$$

where Wgt ($w_{1k_j}$) is the similarity weight of a term $w_{1k_j}$, and SentType($S_1$, $S_2$) represents a weighting factor corresponding to the matching condition between two elements. If the interrogative sentence types of the two elements $S_1$, $S_2$ matches, the corresponding weighting factor is the first value, for example, 1. Otherwise, it is the second value, for example, 0.8.

Hereinafter, it will be described how to calculate the theme matching similarity between two elements by way of one specific example. It is assumed that the first element $S_1$ is "华中科技大学在湖北武汉哪个地方 (Which place in Wuhan of Hubei province is Huazhong University of Science and Technology at)", and the second element $S_2$ is "华科大在武汉市什么位置 (What is the position of HUST in Wuhan)".

Firstly, term segmentation and part-of-speech tagging are performed on the two elements, respectively. For simplicity, part-of-speech tagging is not illustrated in this example. The term segmentation results of $S_1$ comprise: "华中科技大学 (Huazhong University of Science and Technology)", "在 (at)", "湖北 (Hubei)", "武汉 (Wuhan)" and "哪个地方 (which place)", wherein the terms of smaller term segmentation granularity of "华中科技大学" are "华中 (huahzhong)", "科技 (technology)" and "大学 (university)" and the terms of smaller term segmentation granularity of "哪个地方 (which place)" are "哪个 (which)" and "地方 (place)", The term segmentation results of $S_2$ comprise: "华科大 (HUST)", "在 (in)", "武汉市 (Wuhan)" and "什么位置 (what is the position)", wherein the terms of smaller term segmentation granularity of "什么位置" are "什么 (what)" and "位置 (position)".

Weights are assigned to the resulting terms after term segmentation. Optionally or additionally, semantically redundant terms in the elements are also identified, and the weights of the redundant terms are reduced. The identification of the semantically redundant term may be implemented by various technologies which are currently known or will be developed in the future, and the present application has no limitation in this aspect. After identification of the semantically redundant terms, the weight of a term which is determined to be a semantically redundant term will be reduced, for example, "湖北" in the first element.

Thereafter, the terms having semantically mapped terms are mapped as normalized expressions. Specifically, in the first element $S_1$, it is determined to map "华中科技大学" to "华中科技大学", "武汉", to "武汉", and "哪个地方" to "哪里 (where)". In the second element $S_2$, "华科大" is mapped to "华中科技大学", "武汉市" is mapped to "武汉" and "什么位置" is mapped to "哪里".

In addition, the interrogative sentence types of the two elements are matched. Since the interrogative sentence type corresponding to the interrogative "哪个" and the noun "地方" in the context thereof is "location", and the interrogative sentence type corresponding to the interrogative "哪个" and the noun "位置" in the context thereof is "location", it can be identified that the interrogative sentences $S_1$ and $S_2$ belong to the same interrogative sentence type, and it thus can be determined that the weighting factor is equal to the first value, for example, 1.

Figure 6:
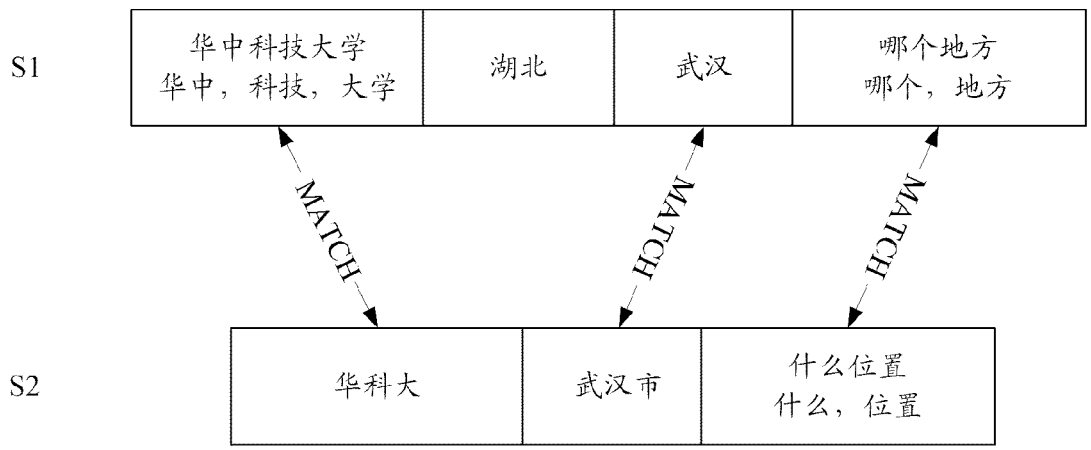
FIG. 6 illustrates a schematic diagram of results after elements are processed according to an embodiment of the present application.

FIG. 6 illustrates a schematic diagram of the results of the elements after the above processes.

As shown in FIG. 6, in the first element $S_1$, "华中科技大学", "华中", "科技" and "大学" correspond to the first semantic mapping position, "湖北" corresponds to the second semantic mapping position, "武汉" corresponds to the third semantic mapping position, and "哪个地方", "哪个" and "地方" correspond to the fourth semantic mapping position. In the second sentence $S_2$, "华科大" corresponds to the first semantic mapping position, "武汉市" corresponds to the second semantic mapping position, "什么位置", "什么", "位置" correspond to the third semantic mapping position.

Since "华中科技大学" and "华科大" are mapped to the same normalized expression, "华中科技大学" and "华科大" are successfully matched terms. "在" is a stopword and will be ignored for calculation. "武汉" and "武汉市" are mapped to the same normalized expression, and thus "武汉" and "武汉市" also are successfully matched terms. "哪个地方" and "什么位置" are mapped to the same normalized expression, and thus "哪个地方" and "什么位置" also are successfully matched terms.

The theme matching similarity between the two element may be calculated using the above formula (3):

Sim($S_1$, $S_2$)=1*[Wgt (华中科技大学)*Wgt (华科大)+Wgt (武汉)*Wgt (武汉市+Wgt (哪个地方)*Wgt (什么位置)]/{[Wgt 华中科技大学)$^2$+Wgt 湖北)$^2$+Wgt (武汉)$^2$+Wgt (哪个地方)$^2$]$^{1/2}$*[Wgt (华科大))$^2$+Wgt (武汉市)$^2$+Wgt (什么位置)$^2$]$^{1/2}$}.

In the embodiment of the present application, calculating the theme matching similarity between the elements of the query request and the candidate result by means of the inter-element text theme matching model based on the pre-constructed click-escape model may be embodied as: adjusting similarity weights of some terms in the elements of the candidate results by means of the click-escape model.

The initial similarity weight of a term may be assigned by technologies known in the text mining field. There may be multiple weight assignments means, and the common multiple weight assignment means comprise, for example, TF-IDF (term frequency-inverse document frequency).

TF-IDF is a commonly used weighting technology for information search and information mining. It is widely used in search, document classification and other related fields. The main idea of TF-IDF is: if the term frequency of a term or a phrase in an article is high and rarely occurs in other articles, the term or the phrase is considered to have a good category distinguishing capability and suitable for classification. TF (Term Frequency) refers to the number of occurrence of a certain term in a document. The main idea of IDF (Inverse Document Frequency) is: the less documents include a term, the higher IDF is, indicating that the term has a good category distinguishing capability. The importance of a certain keyword in an article may be calculated by means of TF and IDF. The weights of the terms may be constructed by means of various function relationships based on TF and IDF.

In some implementations, the initial weights of the terms may be calculated as follows:

$$Wgt_{ini}(w_{1k_i}) = (\log TF(w_{1k_i}) + 1) * \log IDF(w_{1k_i}) \quad (4)$$

$$= (\log TF(w_{1k_i}) + 1) * \log(N/DF(w_{1k_i}))$$

where, TF ($w_{1k_j}$) is the term frequency of a segmented term $w_{1k_j}$, which may be indicated as a ratio of a number of occurrence of the segmented term $w_{1k_j}$ a document to a total number of the segmented terms in the document; IDF ($w_{1k_j}$) is a inverse document frequency of the segmented term $w_{1k_j}$, N is the total number of documents, and DF ($w_{1k_j}$) is the number of documents in which the segmented term $W_{1k_j}$ occurs.

In some embodiments of the present application, after the initial weights of the segmented terms in the elements are determined, the similarity weights of some segmented terms in the elements of the candidate results may be adjusted based on the click-escape model.

Figure 7:
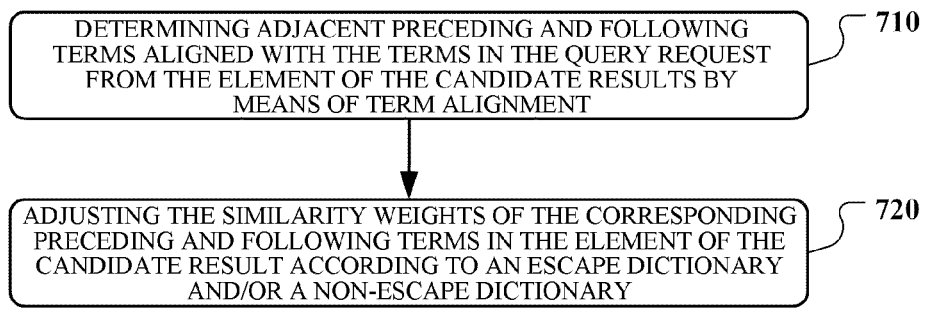
FIG. 7 illustrates an exemplary flow chart of a method for adjusting similarity weight of a segmented term based on the click-escape model according to an embodiment of the present application.

FIG. 7 illustrates an exemplary flow chart of a method for adjusting the similarity weights of segmented terms based on the click-escape model according to an embodiment of the present application.

As shown in FIG. 7, in step 710, adjacent preceding and following terms aligned with the terms in the query request from the element of the candidate results are determined by means of term aligning. This step is similar to step 220 of constructing a click-escape model described in conjunction with FIG. 2, and thus it will not be repeated herein.

Next, in step 720, the similarity weights of the corresponding preceding and following terms in the element of the candidate result are adjusted according to an escape dictionary and/or a non-escape dictionary.

In this step, the escape dictionary and the non-escape dictionary may be consulted for the identified adjacent preceding and following terms, so as to adjust the similarity weights of the adjacent preceding and following terms.

Specifically, if the non-escape dictionary comprises the corresponding term in the element of the candidate result and the adjacent preceding term or the adjacent following terms thereof, the similarity weight of the adjacent preceding term or the adjacent following term should be reduced. If the escape dictionary comprises the corresponding term in the element of the candidate result and the adjacent preceding term or the adjacent following term thereof, the similarity weight of the adjacent preceding term or the adjacent following term should be increased. Meanwhile, if neither the non-escape dictionary nor the escape dictionary comprises the corresponding term and the adjacent preceding term or the adjacent following term thereof, the similarity weight should not be adjusted.

For example, the query element is "中国国旗", and the candidate result is "海里有挂满中国国旗的渔船", and the adjacent preceding term is "挂满", and the adjacent following term is "渔船". The terms of "中国" and the adjacent preceding term is "挂满" may be looked up firstly in the original escape dictionary and the original non-escape dictionary. The similarity weight of "挂满" may be reduced if the original non-escape dictionary comprises "中国" and "挂满", and thus the theme matching similarity is improved. The generalized escape dictionary and the generalized non-escape dictionary may be consulted if neither the original escape dictionary nor the original non-escape dictionary comprises "中国" and "挂满". Similarly, if the generalized non-escape dictionary comprises "[geographic name], 挂满", the weight of "挂满" may be reduced, i.e., the similarity weight of "挂满" is reduced, and thus the theme matching similarity is improved. The terms of "国旗" and the adjacent following term "渔船" may be processed based on the same idea, and it will not be repeated herein.

After adjusting the similarity weight of a term based on the click-escape model, the inter-element text theme matching model as described above may be used to calculate the theme matching similarity between the query request and the candidate result.

For example, the theme matching similarity between the query request and the element of the candidate result may be calculated by the following formula:

$$Sim(Q, S) = \frac{\sum_{w_{1k}=w_{2l}} (Wgt(w_{1k}) * Wgt(w_{2l}))}{\sqrt{\sum_{k=1...M} Wgt(w_{1k})^2} \sqrt{\sum_{l=1...N} Wgt(w_{2l})^2}} * SentType(Q, S) \quad (5)$$

where, Sim(Q,S) represents the theme matching similarity between Q and S; Q is the query request; S represents the element of the candidate result; SentType(Q,S) represents the weight factor of type matching of two elements; Wgt($w_{1k}$) is the similarity weight of term w obtained from the query request; M is the amount of term $w_{1k}$; Wgt($w_{2l}$) is the similarity weight of term $w_{2l}$ obtained from the element of the candidate result; N is the amount of term $w_{2l}$, wherein some terms of the element of the candidate result (for example, the adjacent preceding term and/or the following term) are adjusted based on the click-escape model.

Referring back to FIG. 5, in step 512, an escape factor is determined according to the matching condition between the element of the candidate result and the query request.

At the microcosmic level, when determining the inter-element theme matching similarity in step 511, the similarity weights of specific terms are adjusted based on the click-escape model. In step 512, an escape factor is determined according to the matching condition between the element of the candidate result and the query request, i.e. at the macrocosmic level.

The matching condition between the element of the candidate result and the query request may comprise, for example: a most important term in the query request is not included in the element of the candidate result; matching of the preceding term and the following term occurs; and complete matching of the preceding term or the following term doesn't occur.

In the case that the most important term in the query request is not included in the element of the candidate result, it usually represents that the correlation between the term and the element of the candidate result is low, and the possibility that the escape occurs is high. At the point, the escape factor may be determined as a first value, for example, 0.7. The importance of a term in the query request may be determined based on the previously determined similarity weight. For example, it may be determined directly according to the weight determined by the TF-IDF technology.

If matching of the preceding term or the following term occurs, in addition to literal matching of the term, the candidate result also comprises the adjacent preceding term or the adjacent following term of the term. In other words, in this case, the candidate results may also escape. Therefore, the escape factor may be determined as a second value, which is greater than the first value, for example, 0.95.

If complete matching of the preceding term or the following term doesn't occur, in addition to literal matching of the term, the candidate results does not comprise the adjacent preceding term or the adjacent following term, either. In other words, in this case, the candidate results substantially won't escape. Therefore, the escape factor may be determined as the second value, which is greater than the second value, for example, 1.

At last, in step 513, a semantic relatedness between the element of the candidate result and the query request is calculated based on the escape factor and the theme matching similarity.

The semantic relatedness may be constructed in accordance with various function relations based on the escape factor and the theme matching similarity. In one implementation, the semantic relatedness between the element of the candidate result and the query request may be calculated by the following formula:

$$Rele(Q,S)=\beta(Q,S)Sim(Q,S)$$

where, Rele(Q,S) represents the semantic relatedness between Q and S; β(Q,S) represents the escape factor between Q and S; Sim(Q,S) represents the theme matching similarity between Q and S; Q represents the query request; and S represents the element of the candidate result.

It should be noted that, although the operations of the method of the present invention are described in a particular order in the drawings, it is not required or implied that these operations must be performed in the particular order, or the desired result may be achieved only by performing all of the illustrated operations. Instead, the steps illustrated in the flow charts may be performed in another order. Additionally or alternatively, certain steps may be omitted, a plurality of steps may be combined into one step to execute, and/or one step may be divided into a plurality of steps to execute.

Figure 8:
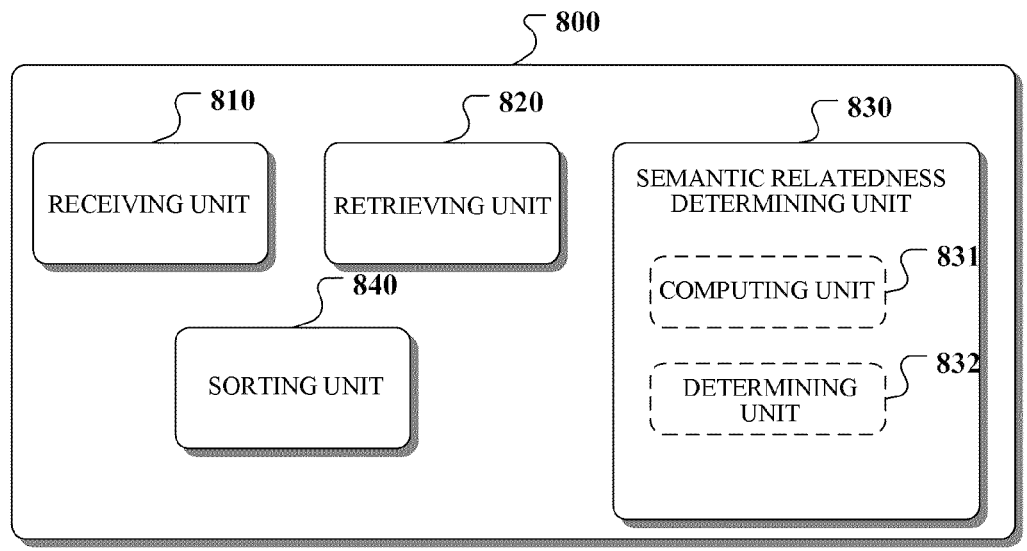
FIG. 8 illustrates an exemplary structural block diagram of a search engine according to an embodiment of the present application.

With further reference to FIG. 8, an exemplary structural block diagram of a search engine according to one embodiment of the present application is illustrated.

As shown in FIG. 8, a search engine 800 comprises a receiving unit 810, a searching unit 820, a semantic relatedness determining unit 830 and a sorting unit 840.

The receiving unit 810 may be configured to receive a query request input by a user. The searching unit 820 may be configured to search candidate results that match the query request. The semantic relatedness determining unit 830 may be configured to determine a semantic relatedness between the query request and each of the candidate results based on a click-escape model. The sorting unit 840 may be configured to sort the candidate results according to the semantic relatedness. The click-escape model comprises an escape dictionary and/or a non-escape dictionary. The escape dictionary escape dictionary comprises a term corresponding to the searched result which is determined to escape and a preceding term and a following term of the term, and the non-escape dictionary comprises a term corresponding to the searched result which is determined not to escape and a preceding term and a following term of the term.

In some embodiments, the semantic relatedness determining unit 830 may comprise a computing unit 831 for determining a semantic relatedness between the query request and one or more elements of the candidate results for each of the candidate results, wherein the elements comprise at least one of: a title of the candidate result, an anchor text and a core sentence in the text. The semantic relatedness determining unit 830 may further include a determining unit 832 for determining a semantic relatedness between the query request and the candidate result according to the determined semantic relatedness between the query request and one or more elements of the candidate result.

In some implementations, the computing unit 831 may comprise: a theme matching similarity module (not shown) for calculating a theme matching similarity between the query request and the element of the candidate result by means of an inter-element text theme matching model based on the click-escape model.

In particular, the theme matching similarity module may be used for: determining adjacent preceding and following terms aligned with terms in the query request from the element of the candidate results by means of term aligning; adjusting the similarity weights of the corresponding preceding term and the corresponding following term in the element of the candidate result according to the escape dictionary and/or the non-escape dictionary; and calculating a theme matching similarity between the query request and the element of the candidate result by means of the inter-element text theme matching model according to the adjusted similarity weights.

The computing unit 831 may further comprise: an escape factor module (not shown) for determining an escape factor according to the matching condition between the query request and the element of the candidate result.

Particularly, the escape factor module may be used for: determining the escape factor as a first value if the matching condition is that the most important term in the query request is not included in the element of the candidate result; determining the escape factor as a second value if the matching condition is that matching of the preceding term or the following term occurs; and determining the escape factor as a third value if the matching condition is that complete matching of the preceding term or the following term doesn't occur, wherein the first value is less than the second value, and the second value is less than the third value.

The computing unit 831 may further comprise a synthesizing module (not shown) for calculating a semantic relatedness between the query request and the element of the candidate result based on the escape factor and the theme matching similarity.

In some embodiments, the escape dictionary and the non-escape dictionary in the click-escape model are constructed by learning the number of clicks of a Query-Title pair for the query request and the searched result.

In some implementations, the escape dictionary and the non-escape dictionary comprise a native escape dictionary and a native non-escape dictionary constructed by: searching a click-to-display ratio of a Query-Title pair, the click-to-display ratio is a ratio of the number of clicks to the number of display, the number of display represents the number of time that the searched result is displayed in response to the query request, and the number of clicks represents the number of times the searched result is clicked by a user when the searched result is displayed in response to the query request; searching adjacent preceding and following terms aligned with terms in the query element from the searched result by means of term aligning; adding a corresponding term and a preceding term and a following term of the corresponding term in a Query-Title pair having a click-to-display ratio lower than a first threshold into the native escape dictionary; and adding a corresponding term and a preceding term and a following term of the corresponding term in a Query-Title pair having a click-to-display ratio greater than a second threshold into the native non-escape dictionary.

Alternatively or additionally, the escape dictionary and the non-escape dictionary further comprises a generalized escape dictionary and a generalized non-escape dictionary constructed by: tagging a semantic category of a term in the query request; and constructing the generalized escape dictionary and the generalized non-escape dictionary corresponding to the native escape dictionary and the native non-escape dictionary by means of the tagged semantic category.

It should be understood that the units or sub-units described in the search engine 800 correspond to the steps of the method described above with reference to the flow chart. Therefore, the operations and characteristics described above with reference to the method also apply to the search engine 800 and the units thereof, and thus will not be repeated herein.

Figure 9:
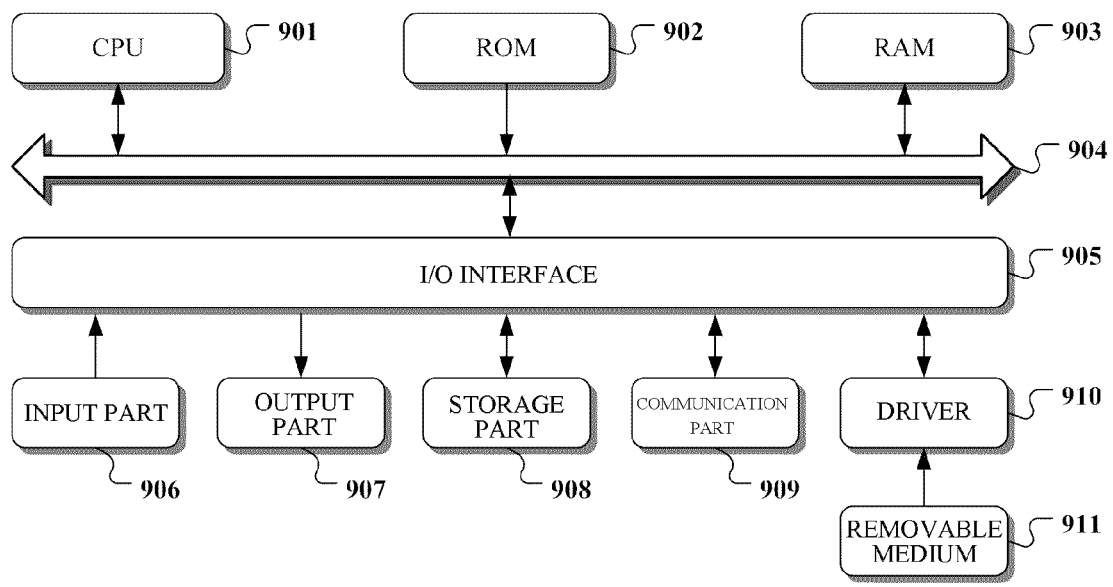
FIG. 9 illustrates a schematic structural diagram of a search engine of an embodiment of the present application.

Referring now to FIG. 9, a schematic structural diagram of a computer system 900 that is adapted for implementing the server of an embodiment of the present application.

As shown in FIG. 9, the computer system 900 comprises a central processing unit (CPU) 901, which may perform a variety of appropriate actions and processes according to a program stored in a read only memory (ROM) 902 or a program loaded to a random access memory (RAM) 903 from a storage part 908. RAM 903 also stores various programs and data required by operations of the system 900. CPU 901, ROM 902 and RAM 903 are connected to each other via a bus 904. An input/output (I/O) interface 905 is also connected to the bus 904.

The following components are connected to the I/O interface 905: an input part 906 comprising a keyboard, a mouse and the like, an output part 907 comprising a cathode ray tube (CRT), a liquid crystal display (LCD), a speaker and the like; the storage part 908 comprising a hard disk and the like; and a communication part 909 comprising a network interface card, such as a LAN card, a modem and the like. The communication part 909 performs communication process via a network, such as the Internet. A driver 910 is also connected to the I/O interface 905 as required. A removable medium 911, such as a magnetic disk, an optical disk, a magneto-optical disk and a semiconductor memory and the like, may be installed onto the driver 910 as required, so as to install a computer program read therefrom to the storage part 908 as needed.

In particular, according to the embodiment of the present disclosure, the process described above with reference to FIGS. 2 to 7 may be implemented as a computer software program. For example, the embodiment of the present disclosure comprises a computer program product, which comprises a computer program that tangibly included in a machine-readable medium. The computer program comprises program codes for executing the method in FIGS. 2 to 7. In such embodiments, the computer program may be downloaded from the network via the communication part 909 and installed, and/or be installed from the removable medium 911.

The flow charts and the block diagrams in the figures illustrate the system architectures, functions, and operations which may be achieved by the systems, devices, methods, and computer program products according to various embodiments of the present application. For this, each block of the flow charts or the block diagrams may represent a module, a program segment, or a portion of the codes which comprise one or more executable instructions for implementing the specified logical functions. It should also be noted that, in some alternative implementations, the functions denoted in the blocks may occur in a different sequence from that marked in the figures. For example, two blocks denoted in succession may be performed substantially in parallel, or in an opposite sequence, which depends on the related functions. It should also be noted that each block of the block diagrams and/or the flow charts and the combination thereof may be achieved by a specific system which is based on the hardware and performs the specified functions or operations, or by the combination of the specific hardware and the computer instructions.

The units or modules involved in the embodiments of the present application may be implemented in hardware or software. The described units or modules may also be provided in a processor. In some cases, the names of these units or modules do not limit the units or modules themselves.

As another aspect, an embodiment of the present application further provides a computer readable storage medium, which may be a computer readable storage medium contained in the device described in above embodiments; or a computer readable storage medium separately exists rather than being fitted into any terminal apparatus. one or more computer programs may be stored on the computer readable storage medium, and the programs are executed by one or more processors to perform the formula input method described in the present application.

The above description is only the preferred embodiments of the present application and the description of the principles of applied techniques. It will be appreciated by those skilled in the art that, the scope of the claimed solutions as disclosed in the present application are not limited to those consisted of particular combinations of features described above, but should cover other solutions formed by any combination of features from the foregoing or an equivalent thereof without departing from the inventive concepts, for example, a solution formed by replacing one or more features as discussed in the above with one or more features with similar functions disclosed (but not limited to) in the present application.

What is claimed is:

1. A method for implementing a search engine, comprising:

receiving a query request input by a user;

searching candidate results that match the query request;

determining a semantic relatedness between the query request and each of the candidate results, based on a click-escape model, wherein the semantic relatedness represents an escape probability of the candidate results with respect to the query request; and sorting the candidate results according to the semantic relatedness, wherein the click-escape model comprises an escape dictionary, a non-escape dictionary, or a combination thereof, the escape dictionary comprises a term corresponding to the searched result which is determined to escape and a preceding term and a following term of the term, and the non-escape dictionary comprises a term corresponding to the searched result which is determined not to escape and a preceding term and a following term of the term, wherein determining the semantic relatedness between the query request and each of the candidate results comprises, for each of the candidate results:

determining the semantic relatedness between one or more elements of the candidate result and the query request, wherein the element comprises at least one of: a title of the candidate result, an anchor text and a core sentence of a text; and determining the semantic relatedness between the query request and the candidate result according to the determined semantic relatedness between one or more elements of the candidate result and the query request, and wherein determining the semantic relatedness between one or more elements of the candidate result and the query request further comprises:

calculating a theme matching similarity between the element of the candidate result and the query request by means of an inter-element text theme matching model, based on the click-escape model;

determining an escape factor according to a matching condition between the element of the candidate result and the query request; and calculating the semantic relatedness between the element of the candidate result and the query request, based on the escape factor and the theme matching similarity.

2. The method of claim 1, wherein calculating the theme matching similarity between the element of the candidate result and the query request based on the click-escape model comprises:

determining an adjacent preceding term and an adjacent following term aligned with a term in the query request from the element of the candidate result by means of term aligning;

adjusting similarity weights of the corresponding preceding term and the corresponding following term in the element of the candidate result according to the escape dictionary, the non-escape dictionary, or a combination thereof; and calculating the theme matching similarity between the element of the candidate result and the query request by the inter-element text theme matching model, according to the adjusted similarity weights.

3. The method of claim 2, wherein adjusting the similarity weights of the corresponding preceding term and the corresponding following term in the element of the candidate result according to the escape dictionary, the non-escape dictionary, or a combination thereof comprises:

if the non-escape dictionary comprises a corresponding term and the preceding term or the following term of the corresponding term in the element of the candidate result, reducing the similarity weight of the preceding term or the following term; and if the escape dictionary comprises the corresponding term and the preceding term or the following term of the corresponding term in the element of the candidate result, increasing the similarity weight of the preceding term or the following term.

4. The method of claim 2, wherein the inter-element text theme matching model is a vector space model and is expressed as:

$$Sim(Q, S) = \frac{\sum\limits_{w_{1k}=w_{2l}} (Wgt(w_{1k}) * Wgt(w_{2l}))}{\sqrt{\sum\limits_{k=1...M} Wgt(w_{1k})^2} \sqrt{\sum\limits_{l=1...N} Wgt(w_{2l})^2}} * SentType(Q, S)$$

where Sim(Q,S) represents the theme matching similarity between Q and S; Q represents the query request; S represents the element of the candidate result; SentType (Q,S) represents a weight factor of a type matching condition between two elements; $Wgt(w_{1k})$ represents a similarity weight of a term $w_{1k}$ obtained from the query request; M represents an amount of the term $w_{1k}$; $Wgt(w_{2l})$ represents a similarity weight of a term $w_{2l}$ obtained from the element of the candidate result; N is an amount of the term $W_{2l}$.

5. The method of claim 1, wherein determining the escape factor according to the matching condition between the element of the candidate result and the query request comprises:
   determining the escape factor as a first value if the matching condition is that a most important term in the query request is not included in the element of the candidate result;
   determining the escape factor as a second value if the matching condition is that matching of a preceding term or a following term occurs; and
   determining the escape factor as a third value if the matching condition is that complete matching of the preceding term or the following term doesn't occur,
   wherein the first value is less than the second value, and the second value is less than the third value.

6. The method of claim 1, wherein the semantic relatedness between the element of the candidate result and the query request is calculated by the following formula:

$$Rele(Q,S)=\beta(Q,S)Sim(Q,S)$$

where Rele(Q,S) represents the semantic relatedness between Q and S; β(Q,S) represents the escape factor between Q and S; Sim(Q,S) represents the theme matching similarity between Q and S; Q represents the query request; and S represents the element of the candidate result.

7. The method of claim 1, wherein the escape dictionary and the non-escape dictionary in the click-escape model are constructed by learning a number of clicks of a Query-Title pair for the query request and the searched result.

8. The method of claim 7, wherein the escape dictionary and the non-escape dictionary comprise a native escape dictionary and a native non-escape dictionary, the native escape dictionary and a native non-escape dictionary comprising:
   searching a click-to-display ratio of the Query-Title pair, wherein the click-to-display ratio is a ratio of the number of clicks to a number of display, the number of display represents the number of times the searched result is displayed in response to the query request, and the number of clicks represents the number of times the searched result is clicked by the user when the searched result is displayed in response to the query request;
   searching an adjacent preceding term and an adjacent following term aligned with a term in the query request from the searched result by means of the term aligning;
   adding a corresponding term and a preceding term and a following term of the corresponding term in the Query-Title pair having the click-to-display ratio lower than a first threshold into the native escape dictionary; and
   adding a corresponding term and a preceding term and a following term of the corresponding term in the Query-Title pair having the click-to-display ratio greater than a second threshold into the native non-escape dictionary.

9. The method of claim 8, wherein the escape dictionary and the non-escape dictionary further comprise a generalized escape dictionary and a generalized non-escape dictionary that are constructed by:
   tagging a semantic category of a term in the query request; and
   constructing the generalized escape dictionary and the generalized non-escape dictionary corresponding to the native escape dictionary and the native non-escape dictionary by means of the tagged semantic category.

10. The method of claim 2, wherein the term aligning comprises synonym aligning.

11. A search engine, comprising:
   at least one processor; and
   a memory storing instructions, which when executed by the at least one processor, cause the at least one processor to perform operations, the operations comprising:
      receiving a query request input by a user;
      searching candidate results that match with the query request;
      determining a semantic relatedness between the query request and each of the candidate results based on a click-escape model; and
      sorting the candidate results according to the semantic relatedness,
   wherein the click-escape model comprises an escape dictionary, a non-escape dictionary, or a combination thereof, the escape dictionary comprises a term corresponding to the searched result which is determined to escape and a preceding term and a following term of the term, and the non-escape dictionary comprises a term corresponding to the searched result which is determined not to escape and a preceding term and a following term of the term,
   wherein determining the semantic relatedness between the query request and each of the candidate results comprises, for each of the candidate results:
      determining the semantic relatedness between one or more elements of the candidate result and the query request, wherein the element comprises at least one of: a title of the candidate result, an anchor text and a core sentence of a text; and
      determining the semantic relatedness between the query request and the candidate result according to the determined semantic relatedness between one or more elements of the candidate result and the query request, and
   wherein determining the semantic relatedness between one or more elements of the candidate result and the query request further comprises:
      calculating a theme matching similarity between the element of the candidate result and the query request by means of an inter-element text theme matching model, based on the click-escape model;
      determining an escape factor according to a matching condition between the element of the candidate result and the query request; and calculating the semantic relatedness between the element of the candidate result and the query request, based on the escape factor and the theme matching similarity.

12. The search engine of claim 11, wherein calculating the theme matching similarity between the query request and the element of the candidate result by means of an inter-element text theme matching model, based on the click-escape model comprises:
determining an adjacent preceding term and an adjacent following term aligned with a term in the query request from the element of the candidate result by means of term aligning;
adjusting similarity weights of the corresponding preceding term and the corresponding following term in the element of the candidate result according to the escape dictionary, the non-escape dictionary, or a combination thereof; and
calculating the theme matching similarity between the element of the candidate result and the query request by the inter-element text theme matching model, according to the adjusted similarity weight.

13. The search engine of claim 11, wherein determining the escape factor according to a matching condition between the query request and the element of the candidate result comprises:
determining the escape factor as a first value if the matching condition is that a most important term in the query request is not included in the element of the candidate result;
determining the escape factor as a second value if the matching condition is that matching of a preceding term or a following term occurs; and
determining the escape factor as a third value if the matching condition is that complete matching of the preceding term or the following term doesn't occur,
wherein the first value is less than the second value, and the second value is less than the third value.

14. The search engine of claim 11, wherein the escape dictionary and the non-escape dictionary in the click-escape model are constructed by learning a number of clicks of a Query-Title pair for the query request and the searched result.

15. The search engine of claim 14, wherein the escape dictionary and the non-escape dictionary comprise a native escape dictionary and a native non-escape dictionary that are constructed by:
searching a click-to-display ratio of the Query-Title pair, wherein the click-to-display ratio is a ratio of the number of clicks to a number of display, the number of display represents the number of times the searched result is displayed in response to the query request, and the number of clicks represents the number of times the searched result is clicked by the user when the searched result is displayed in response to the query request;
searching an adjacent preceding term and an adjacent following term aligned with a term in the query request from the searched result by means of the term aligning;
adding a corresponding term and a preceding term and a following term of the corresponding term in the Query-Title pair having the click-to-display ratio lower than a first threshold into the native escape dictionary; and
adding a corresponding term and a preceding term and a following term of the corresponding term in a Query-Title pair having the click-to-display ratio greater than a second threshold into the native non-escape dictionary.

16. The search engine of claim 15, wherein the escape dictionary and the non-escape dictionary further comprise a generalized escape dictionary and a generalized non-escape dictionary that are constructed by:
tagging a semantic category of a term in the query request; and
constructing the generalized escape dictionary and the generalized non-escape dictionary corresponding to the native escape dictionary and the native non-escape dictionary by means of the tagged semantic category.

* * * * *